(12) United States Patent
Tse

(10) Patent No.: US 6,439,540 B1
(45) Date of Patent: Aug. 27, 2002

(54) BUTTERFLY VALVE NOISE SUPPRESSOR

(75) Inventor: Man-Chun Tse, Brossard (CA)

(73) Assignee: Pratt & Whitney Canada Corp., Quebec (CA)

( * ) Notice: Subject to any disclaimer, the term of this patent is extended or adjusted under 35 U.S.C. 154(b) by 0 days.

(21) Appl. No.: 09/699,450

(22) Filed: Oct. 31, 2000

(51) Int. Cl.$^7$ .............................. F16L 55/02; F16K 1/22
(52) U.S. Cl. ...................... 251/127; 251/118; 251/305
(58) Field of Search .................... 251/127, 118, 251/305; 138/37, 40; 181/175, 212, 224

(56) References Cited

U.S. PATENT DOCUMENTS

| | | | | |
|---|---|---|---|---|
| 1,473,508 A | * | 11/1923 | O'Nan | 138/37 |
| 2,492,784 A | * | 12/1949 | Christman | 181/236 |
| 3,238,955 A | | 3/1966 | Lassiter, Jr. | |
| 3,998,195 A | | 12/1976 | Scott | |
| 4,300,656 A | | 11/1981 | Burcham | |
| 4,402,485 A | | 9/1983 | Fagerlund | |
| 4,420,016 A | * | 12/1983 | Nichols | 138/103 |
| 4,691,894 A | | 9/1987 | Pyötsiä et al. | |
| 5,218,984 A | * | 6/1993 | Allen | 137/1 |
| 5,293,742 A | * | 3/1994 | Gillingham et al. | 55/466 |
| 5,465,756 A | | 11/1995 | Royalty et al. | |
| 5,658,656 A | * | 8/1997 | Whitney et al. | 428/304.4 |
| 5,717,172 A | | 2/1998 | Griffin, Jr. et al. | |
| 5,758,614 A | * | 6/1998 | Choi | 123/184.53 |
| 5,870,896 A | * | 2/1999 | Clark et al. | 137/613 |
| 5,881,995 A | | 3/1999 | Tse et al. | |
| 5,959,263 A | * | 9/1999 | Foltz, Jr. | 181/236 |

FOREIGN PATENT DOCUMENTS

| | | |
|---|---|---|
| EP | 101323 | 2/1984 |
| EP | 863303 | 9/1998 |
| JP | 61256082 | 11/1986 |

* cited by examiner

Primary Examiner—Henry C. Yuen
Assistant Examiner—David A. Bonderer
(74) Attorney, Agent, or Firm—Bachman & LaPointe, P.C.

(57) ABSTRACT

A butterfly valve noise suppressor is provided for reducing the noise generated by a gas flow passing through an open butterfly valve having a disc pivotally mounted in a valve housing for rotation about a transverse axis between an open and a closed position thereof. The noise suppressor includes a plurality of flat and perforated baffle plates arranged in a cruciform configuration, mounted in a flow path immediately downstream of the pivotal disc, axially extending and thereby dividing the downstream flow path into four axial and quadrant cross-sectional segments. The gas flow passing the edge of the pivotal disc in the valve generates a flow turbulence to form an unsteady large wake downstream of the valve. This unsteady wake is the source of noise. The cruciform baffle plates permit the gas flow to pass therethrough without obstruction thereto, while allowing the turbulence to communicate laterally through the perforation, thereby dissipating the wake unsteadiness to reduce noise. The butterfly valve noise suppressor according to the present invention provides a better acoustic result compared to a muffler used in a conventional butterfly valve, and is lighter, durable, simpler and more economical to manufacture.

12 Claims, 2 Drawing Sheets

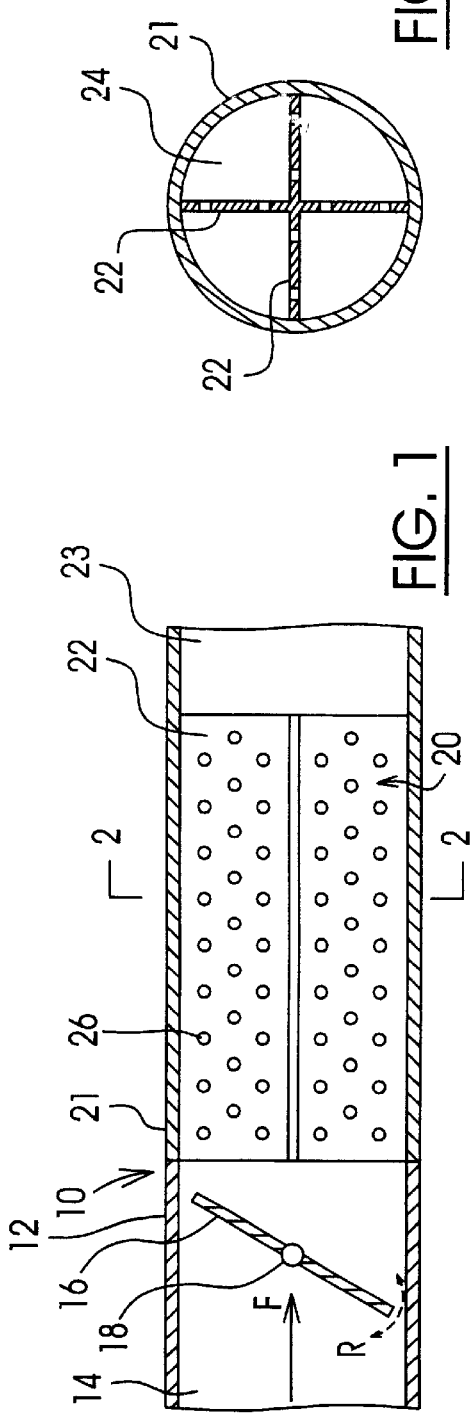
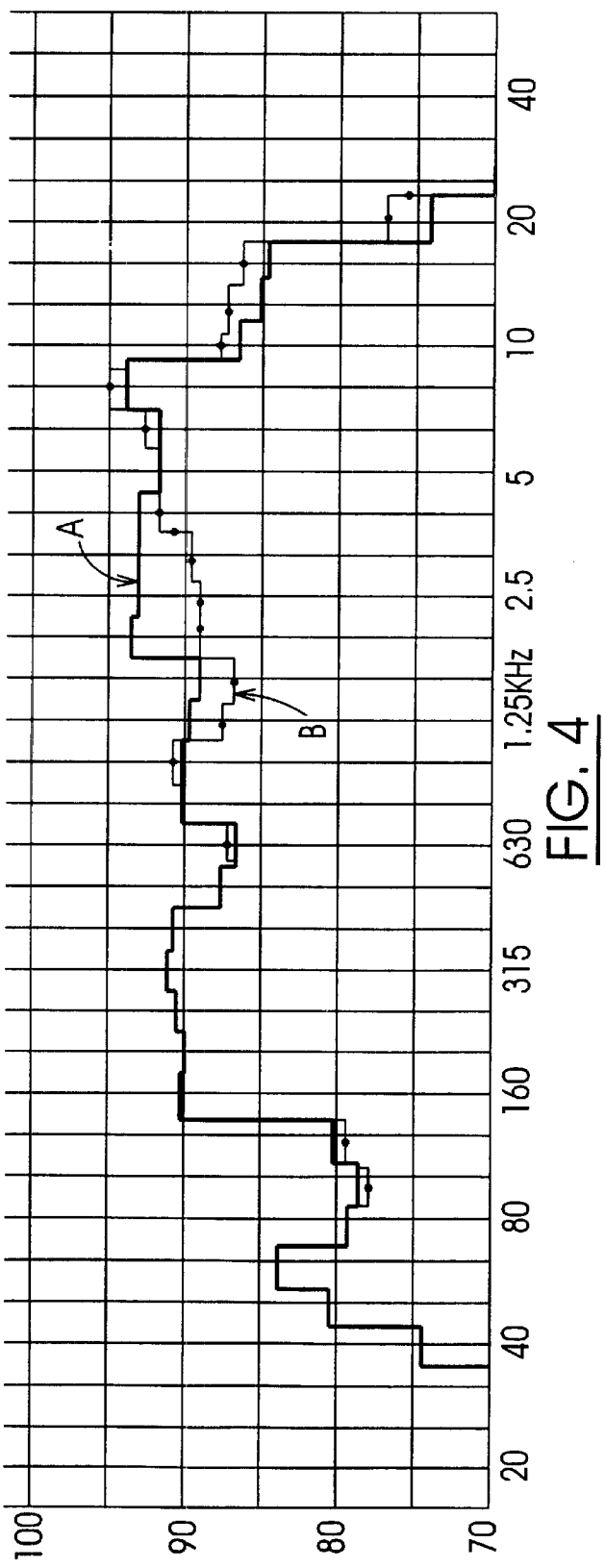

BUTTERFLY VALVE NOISE SUPPRESSOR

FIELD OF THE INVENTION

The present invention relates to a noise suppressing device and, more particularly, to a device which is adapted to suppress the noise generated by a flow of gas passing through a butterfly valve when in an open position thereof.

BACKGROUND OF THE INVENTION

Conventional butterfly valves comprise a disc plate positioned in a duct for rotation about a transverse axis defined by a shaft in order to control a fluid flow through the duct. Typically, the disc is rotated via a torque applied by an external actuator through the shaft. Butterfly valves have been widely used in the aircraft industry. In an aircraft auxiliary power unit (APU), the load compressor flow is used for different purposes such as main engine start, and cabin air conditioning for aircraft on the ground when the main engine is not in use. This load compressor air is normally diverted and damped into the auxiliary power unit exhaust duct through a ducting with a diverter-valve regulating the flow. The diverter-valve is normally a butterfly valve type for simplicity in design. However, the use of a butterfly valve usually results in undesirable effects such as vibration, wear and noise. For example, high speed gas flow generates aerodynamic throttling noise in frequency regimes between one 1 k Hz–5 k Hz over a wide range of valve openings.

Various solutions have been proposed for reducing the valve noise level, notably the installation of a noise attenuating device, such as a muffler immediately downstream of the butterfly valve. Such butterfly valve and muffler assemblies are well known and widely used in connection with gas turbine engines. However, it has been observed that the muffler deteriorates over time. Moreover, the butterfly valve and muffler assembly, increases the weight and cost of the overall gas turbine engine.

Efforts have also been made to suppress the noise at the source as, for instance, in U.S. Pat. No. 3,238,955 issued to Lassiter, Jr. on Mar. 8, 1966; U.S. Pat. No. 3,960,177 issued to Baumann on Jun. 1, 1976; U.S. Pat. No. 5,465,756 issued to Royalty et al. on Nov. 14, 1995 and U.S. Pat. No. 5,881,995 issued to the Applicant on Mar. 16, 1999. These prior art patents describe various noise attenuating means mounted on the disc plate of the butterfly valve such as pins, ribs, perforated acoustic fences and tabs, which generate turbulence and/or trap vortices to reduce the wake size downstream of the butterfly valve and thereby reduce noise at the source. Although the butterfly valves described in the above mentioned prior art patents are very effective, their ribs, pins, perforated acoustic fences and tabs create an obstruction to the flow, to a certain extent, and increase the torque applied to the disc plate while in operation.

Alternatively, noise attenuation members are provided in the flow passage after the disc plate of the butterfly valve. Pyötsiä et al. in U.S. Pat. No. 4,691,894 issued on Sep. 8, 1987 describes such a butterfly valve. The noise attenuation members mounted in the flow passage downstream of the disc plate are axially spaced apart and provided with openings extending therethrough. The perforated noise attenuation members radially extend to reduce the cross-sectional area of the flow passage to attenuate the dynamic momentum of the disturbed flow and the noise in the flow passage, and therefore reduce the air pressure loss immediately downstream of the valve. This results in blockage of the flow to a certain extent, which is not desirable, particularly when the butterfly valve is used in an auxiliary power unit for aircraft.

Another acoustic noise elimination technology developed in the aircraft industry is described in U.S. Pat. No. 4,300,656 issued to Burcham on Nov. 17, 1981, for disrupting the continuity of fields of sound pressures forwardly projected from fans or rotors of a type commonly found in a fan or compressor first stage for an air-breathing engine, when operating at tip speeds in the supersonic range. The acoustic noise elimination device includes a sound barrier defined by a plurality of intersecting flat plates having a line of intersection coincident with a longitudinal axis of a tubular cowl, preferably in a cruciform configuration, which serves to disrupt the continuity of rotating fields of noise. Nevertheless, the acoustic noise generated by a fan or compressor is in a form of rotating fields called spinning modes, and is different from the noise generated by the flow wake after a butterfly valve in which there is flow turbulence and no continuous spinning modes exist. This type of sound barrier has never been considered in association with a solution for suppressing butterfly valve noise.

The aircraft industry has been continuously making efforts to improve noise control technology, including suppressing the butterfly valve noise associated with air auxiliary power units used for aircraft. Therefore, there is a need for an improved butterfly valve noise suppressor.

SUMMARY OF THE INVENTION

It is one object of the present invention to provide a noise suppression device for a butterfly valve suppressing turbulence in the flow wake behind the butterfly valve plate, which generates the noise sound waves, without creating a substantial obstruction to the flow.

It is another object of the present invention to provide a noise suppression device for a butterfly valve which is at least acoustically equivalent to a prior art muffler used in the butterfly valve but is simpler, lighter durable in operation and inexpensive to manufacture.

It is a further object of the present invention to provide a butterfly valve which is adapted to generate low noise levels.

It is a still further object of the present invention to provide such a butterfly valve which is relatively simple and economical to manufacture.

The present invention generally provides a method for attenuating butterfly valve noise generated by a gas flow passing an edge of a valve plate in a valve housing. The method comprises a step of deploying at least one perforated plate axially extending in a flow path downstream of the valve plate, and thereby dividing the downstream flow path into a plurality of axial segments to permit the gas flow to pass through the axial segments without a substantial obstruction thereto and causes the turbulence in the gas flow wake behind the valve plate, as well as noise sound waves produced by the turbulence, to cross the perforated plate so that the turbulence and the noise sound waves are suppressed.

In a butterfly valve in operation, the valve plate acts as a bluff body. Flow separation occurs along the valve plate edge, forming a substantial wake behind. The turbulence generated in this unsteady wake is the source of noise. The purpose of the present invention is to suppress or minimize the wake as soon as possible by installing at least a perforated and axially extending baffle plate as a flow straightener immediately downstream of the valve. The perforated baffle plate allows the turbulence components in the wake flow to communicate laterally through its surface, hence dissipating the wake unsteadiness, resulting in a better developed mixed flow at the discharge end of the device. The baffle perforation also suppresses the noise sound waves which are produced by the turbulence and propagate along the perforated baffle plate. Nevertheless, the perforated baffle plate does not create a substantial obstruction to the flow because the baffle plate extends in the direction of the flow.

In accordance with another aspect of the present invention, there is a butterfly valve provided, which comprises a valve housing defining a flow path. A closing member is pivotally mounted in the valve housing for rotation about an axis between an open position for allowing the passage of a gas flow through the valve housing and a closed position for blocking the gas flow through the valve housing. The axis extends transversely and centrally across the closing member so that the closing member has a section to pivot in a generally downstream direction when the closing member moves from the closed toward the open position. A means for attenuating noise is mounted to the valve housing immediately downstream of the closing member but without interfering with the section of the closing member pivoting downstream. The means includes a duct defining a downstream flow path of the butterfly valve, and at least one perforated plate extending axially, mounted to the duct, and preferably extending across a centrally longitudinal axis of the duct, to divide a section of the duct into at least two axial segments.

In one embodiment of the present invention, the duct is cylindrical and the means includes a plurality of flat perforated plates mounted in the duct and arranged in a intersecting configuration, preferably conforming to a cruciform, thereby dividing the section of the cylindrical duct into four axial segments each having a quadrant cross-section.

In accordance with a further aspect of the present invention, a noise suppression device is provided for a butterfly valve which has a closing plate pivotally mounted in a valve housing for rotation about an axis to control a gas flow. The noise suppression device comprises a cylindrical duct connected to the valve housing to form a flow path downstream of the butterfly valve, and a plurality of flat and perforated plates for attenuating noise mounted in the cylindrical duct. The plates are arranged in mutually intercepting planes and have a line of intersection coincident with a longitudinal axis of the cylindrical duct.

The features and advantages of the present invention will be better understood with reference to the preferred embodiments described below.

BRIEF DESCRIPTION OF THE DRAWINGS

Having thus generally described the nature of the invention, reference will now be made to the drawings by way of illustration showing the preferred embodiments in which:

FIG. 1 is a longitudinally cross-sectional and schematical view of a butterfly valve incorporating a preferred embodiment of the present invention;

FIG. 2 is a cross-sectional view taken along line 2—2 in FIG. 1, showing the cruciform configuration of the noise suppressor;

FIG. 4 is a graphic comparison of the noise levels of the butterfly valve employing the cruciform plates according to the present invention compared to that of a muffler installed immediately downstream of a conventional butterfly valve.

DETAILED DESCRIPTION OF THE PREFERRED EMBODIMENT

Figure 3B:
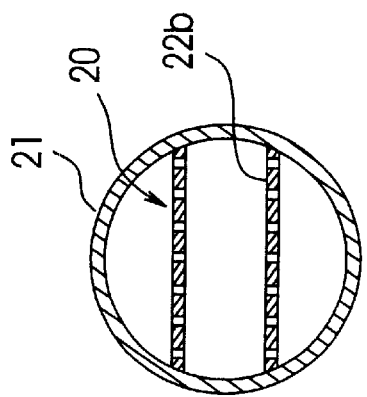
FIGS. 3a–3e are cross-sectional views of the noise suppressor according to other preferred embodiments of the invention.

Referring to FIGS. 1 and 2, a butterfly valve assembly generally indicated at numeral 10 includes a cylindrical housing 12 defining a flow passage 14 of a circular section therethrough. A closing plate 16 is pivotally mounted on a pivot shaft 18 and fitted into the housing 12. The pivot shaft 18 is fitted in the middle of the flow passage 14 and supported at both sides in the housing 12 so that the closing member 16 is adapted for rotation about the pivot shaft 18, as indicated by arrow R. An annular seal (not shown) is provided either on the edge of the closing plate 16 or the interior surface of the housing 12, to seal the annular space between the edge of the closing plate 16 and the interior surface of the housing 12 when the closing plate 16 is rotated to a transverse plane with respect to the longitudinal axis of the cylindrical housing 12 to close the flow passage 14. The flow passage 14 is open and a gas flow indicated by arrow F is permitted to pass through the flow passage 14 and is controlled by the closing plate 16 when the closing plate 16 is rotated by an external actuator (not shown) away from the closed position as shown in FIG. 1.

In the embodiment of FIGS. 1 and 2, a baffle plate assembly 20 is mounted in a cylindrical duct 21 connected to the housing 12, immediately downstream of the closing plate 16 but without interfering with a section of the closing plate 16 pivoting downstream. The baffle plate assembly 20 includes flat and perforated plates 22 arranged in an intersecting configuration conforming to a cruciform and thereby dividing a section of the downstream path 23 defined by the duct 21 into four axial segments 24, each having a quadrant cross-section as shown in FIG. 2. The cruciform configuration of the flat and perforated plates 22 according to this particular embodiment, is made by welding two half sections of a flat and perforated plate 22 to the center line on the respective opposite sides of the complete flat and perforated plate 22 having a total width that is slightly smaller than the inner diameter of the cylindrical duct 21. The baffle plate assembly 20 is then secured to the inner surface of the cylindrical duct 21 by any well known means, such as welding. The duct 21 according to this embodiment as shown in FIG. 1, is connected to the housing 12 by threads (not shown) for example, or any other known means. Nevertheless, the duct 21 may be made integrally with the housing 12.

For practical application in an auxiliary power unit, the baffle plate assembly 20 has a length not smaller than two times the inner diameter of the cylindrical duct 21 with the perforation having a percentage of openings ranging from 40% to 60%. It is suggested that the holes of the flat and perforated plates 22 have a diameter ranging from 0.0625 inches to 0.1875 inches and the thickness of the flat and perforated plates 22 ranges between 0.0625 inches and 0.375 inches. However, the design criteria specified above can be suitably adjusted for a given flow condition in an auxiliary power unit or other application, without deviating from the design and functional principles of the present invention.

In operation, when the closing plate 16 is in a partially open position and the flow passes through the butterfly valve assembly 10, pressure losses arise in the butterfly valve assembly 10 and the flow of the medium can be choked in the flow path 14 depending on the valve opening and mass flow. As a result of the pressure loss, the total pressure upstream of the disturbance point, i.e. the closing plate 16, is higher than downstream of the disturbance point. In the butterfly valve assembly 10, however, the effect of the difference in pressure is not distributed uniformly over the area of the closing plate 16.

As a general principle, flow separation occurs if dp/dx is negative, where dp is a pressure difference over a small distance dx in the streamwise direction. By examining the flow passing the edge of the closing plate, the condition for flow separation can be recognized.

At the face of the inlet side of the closing plate 16, near the edge that is turned towards the upstream flow, to be called leading edge. When movement takes place on the face of the closing plate 16 in the direction of the central diameter towards the edge of the closing plate 16 that is turned downstream, to be called the trailing edge. At both leading and trailing edges, the static pressure is lower than the static pressure at the outlet side of the valve assembly 10. Therefore, dp/dx is negative.

Thus, flow separation occurs along the edge of the closing plate 16, thereby creating a flow turbulence to form a substantial wake therebehind. The flow turbulence in the unsteady wake generates high flow noise. However, when the flow passes the flow path 23 through the four axial quadrant segments 24 without a substantial obstruction thereto, the random components of flow turbulence are inclined to penetrate the perforated plates 22 between the adjacent segments 24, whereby the flow turbulence is damped down and the noise to be further generated by the turbulence is reduced accordingly. On the other hand, the noise sound waves which have already been generated are also suppressed by the perforated baffle plates 22 when the noise sound waves propagate along the perforated baffle plates 22 in the cylindrical duct 21 so that the noise is further reduced to a lower level.

Figure 3A:
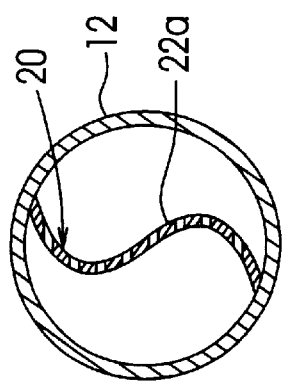
Figure 3E:
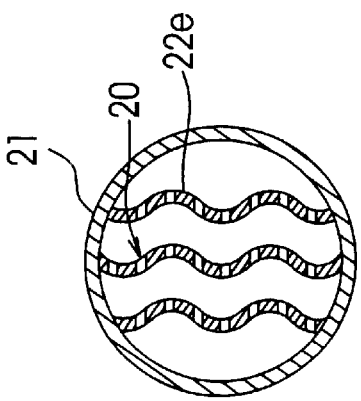
Figure 3D:
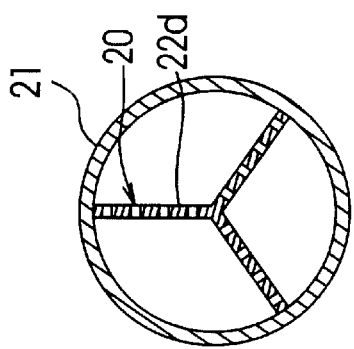
Figure 3C:
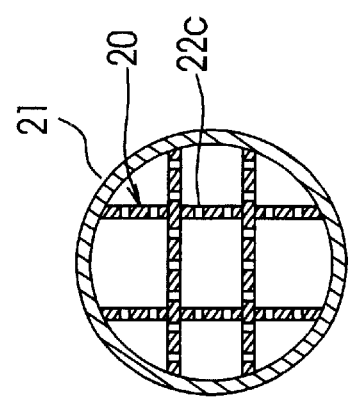

FIGS. 3a–3e illustrate various cross-sectional configurations of the baffle plate according to alternative embodiments of the present invention. The perforated baffle plates may extend across the longitudinal axis of the cylindrical duct 21, such as 22a and 22d or may extend without intersecting the longitudinal line of the cylindrical duct 21, indicated as 22b, 22c and 22e. The baffle plates could be flat as 22b, 22c and 22d or could be curved in a transverse cross-section, such as 22a and 22e. However, it is commonly characterized that all those perforated baffle plates according to the alternative embodiments shown in FIGS. 3a–3e are straight in any longitudinal cross-section and extend axially to ensure that the flow passes therealong without a substantial obstruction thereto. The other design criteria of the perforated baffle plates are similar to those of the embodiment of FIGS. 1 and 2 and will not be redundantly described.

The perforated baffle plates can be made of any suitable materials which are generally used for the piping in auxiliary power units for aircraft.

The noise suppression result of the butterfly valve noise suppressor assembly 10 with the cruciform perforated plates is illustrated in FIG. 4, compared to that of a muffler installed immediately downstream of a conventional butterfly valve. The line A without dots in the graphic comparison of FIG. 4 represents the sound pressure level of a conventional butterfly valve and muffler assembly used in connection with a gas turbine engine while the dotted line B shows test results with a specimen of the present invention with the cruciform perforated plates. The graphical comparison shows that the present invention provides additional noise attenuation of approximately 2 dB to 5 dB over the frequency range of 1.1 k Hz to 4.5 k Hz.

Modifications and improvements to the above-described embodiments of the present invention may become apparent to those skilled in the art. The forgoing description is intended to be exemplary rather than limiting. The scope of the present invention is therefore intended to be limited solely by the scope of the appended claims.

What is claimed is:

1. A butterfly valve comprising:
   a) a valve housing defining a flow path;
   b) a closing member pivotally mounted in the valve housing for rotation about a axis between an open position for allowing the passage of a gas flow through the valve housing and a closed position for blocking the gas flow through the valve housing, the axis extending transversely and centrally across the closing member so that the closing member has a section to pivot in a generally downstream direction when the closing member moves from the closed toward the open position; and
   c) means for attenuating noise mounted to the valve housing immediately downstream of the closing member but without interfering with the section of the closing member pivoting downstream, the means including a duct defining a downstream flow path of the butterfly valve, and at least one perforated plate mounted in the duct, extending axially to divide a section of the duct into at least two axial segments.

2. A butterfly valve as claimed in claim 1 wherein the at least one perforated plate extends across a centrally longitudinal axis of the duct.

3. A butterfly valve as claimed in claim 1 wherein the means includes a plurality of flat perforated plates mounted in the duct and extending in a substantially axial direction thereby dividing the section of the duct into a plurality of axial segments.

4. A butterfly valve as claimed in claim 1 wherein the duct is cylindrical and the perforated plates mutually intersect at an longitudinal axis so that the divided axial segments have sectorial cross sections respectively.

5. A butterfly valve as claimed in claim 1 wherein the perforated plates are arranged in an intersecting configuration conforming to a cruciform, thereby dividing the section of the cylindrical duct into four axial segments each having a quadrant cross section.

6. A butterfly valve as claimed in claim 1 wherein the perforated plate has a length not smaller than two times of an inner diameter of the cylindrical duct.

7. A butterfly valve as claimed in claim 1 wherein the perforated plate has a percentage of opening of a range between 40% and 60%.

8. A method as claimed in claim 1 wherein the perforated plate is placed immediately behind the valve plate but without interfering with the valve plate in operation.

9. A method as claimed in claim 1 comprising a step of deploying a plurality of flat perforated plates axially extending in the downstream flow path, mutually intersecting at an axis coincident with a longitudinal axis of the downstream flow path.

10. A method as claimed in claim 1 wherein the perforated plate has a percentage of opening ranged from 40% to 60%.

11. A method as claimed in claim 1 wherein the perforated plate has a length not smaller than a width thereof.

12. A method for attenuating butterfly valve noise generated by a gas flow passing an edge of a valve plate in a valve housing, comprising a step of deploying at least one perforated plate axially extending in a flow path downstream of the valve plate, and thereby dividing the downstream flow path into a plurality of axial segments to permit the gas flow to pass through the axial segments without a substantial obstruction thereto and cause a turbulence in a gas flow wake behind the valve plate as well as noise sound waves produced by the turbulence to cross the perforated plate so that the turbulence and the noise sound waves are suppressed.

* * * * *